US012148967B2

(12) United States Patent
Sukegawa et al.

(10) Patent No.: US 12,148,967 B2
(45) Date of Patent: Nov. 19, 2024

(54) FILTER AND METHOD FOR MANUFACTURING THE SAME

(71) Applicant: NEC Corporation, Tokyo (JP)

(72) Inventors: Tsuyoshi Sukegawa, Tokyo (JP); Takahiro Miyamoto, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 274 days.

(21) Appl. No.: 17/750,552

(22) Filed: May 23, 2022

(65) Prior Publication Data

US 2022/0393324 A1 Dec. 8, 2022

(30) Foreign Application Priority Data

Jun. 4, 2021 (JP) ................................ 2021-094160

(51) Int. Cl.
*H01P 1/20* (2006.01)
*H01P 11/00* (2006.01)

(52) U.S. Cl.
CPC ............. *H01P 1/20* (2013.01); *H01P 11/003* (2013.01)

(58) Field of Classification Search
CPC ............. H01P 1/20336; H01P 1/20345; H01P 1/2056; H01P 1/2136; H01P 1/2013; H01P 1/203; H01P 1/20327; H01P 1/20363; H01P 1/20; H01P 1/2039; H01P 11/003; H01P 1/207; H01P 1/2086; H01P 1/2135; H01P 11/007; H01P 7/06
See application file for complete search history.

(56) References Cited

U.S. PATENT DOCUMENTS

2008/0238578 A1* 10/2008 Satoh .................... H01P 1/2013 333/204
2019/0157731 A1* 5/2019 Miyamoto ................ H01P 1/20

FOREIGN PATENT DOCUMENTS

JP 2006-352245 A 12/2006

* cited by examiner

*Primary Examiner* — Lincoln D Donovan
*Assistant Examiner* — Tyler J Pereny

(57) ABSTRACT

A filter that can make a reflection delay of an initial stage coupling part correspond to a change in a passband due to a manufacturing error of a substrate or the like is realized. A filter according to an example embodiment includes: a substrate having a dielectric property; an initial stage coupling part formed on the substrate; and an interstage coupling part formed on the substrate. The initial stage coupling part is formed so that a reflection delay is decreased in accordance with an increase in a passband due to a manufacturing error of the substrate or the interstage coupling part, or so that the reflection delay is increased in accordance with a decrease in the passband.

3 Claims, 12 Drawing Sheets

FILTER AND METHOD FOR MANUFACTURING THE SAME

INCORPORATION BY REFERENCE

This application is based upon and claims the benefit of priority from Japanese patent application No. 2021-94160, filed on Jun. 4, 2021, the disclosure of which is incorporated herein in its entirety by reference.

TECHNICAL FIELD

The present disclosure relates to a filter and a method for manufacturing the same.

BACKGROUND ART

In order to realize a small high-frequency filter, it is common to use a planar circuit composed of a pattern of copper foil (conductor) designed on a substrate so as to have a predetermined distributed constant. For example, Japanese Unexamined Patent Application Publication No. 2006-352245 discloses a filer including: a resonant circuit including an input-side half-wavelength resonator and an output-side half-wavelength resonator; a power divider in which an input line of a characteristic impedance is branched into two by a line of the characteristic impedance, the branched parts are coupled by the resistance of the characteristic impedance at a point of ¼ wavelength, and extended parts of the branched lines are respectively edge-coupled to parts of both side surfaces of the input-side half-wavelength resonator, each having a length of ¼ wavelength; and a power combiner in which an output line of a characteristic impedance is branched into two by a line of the characteristic impedance, branched parts are coupled by the resistance of the characteristic impedance at a point of ¼ wavelength, and extended parts of the branched lines are respectively edge-coupled to parts of both side surfaces of the output-side half-wavelength resonator, each having a length of ¼ wavelength.

SUMMARY

The filter disclosed in Japanese Unexamined Patent Application Publication No. 2006-352245 is a technology for strengthening edge coupling, but has a problem that it cannot cope with a change in a passband due to a manufacturing error of a substrate or the like.

One of the objects that are achieved by example embodiments disclosed herein is to provide a filter and a method for manufacturing the same that contribute to solving the above problem. It should be noted that the above-described object is merely one of the objects to be attained by the example embodiments disclosed herein. Other objects or problems and novel features will be made apparent from the following description and the accompanying drawings.

A filter according to a first example aspect includes:

a substrate having a dielectric property;

an initial stage coupling part formed on the substrate; and an interstage coupling part formed on the substrate, in which the initial stage coupling part is formed so that a reflection delay is decreased in accordance with an increase in a passband due to a manufacturing error of the substrate or the interstage coupling part, or so that the reflection delay is increased in accordance with a decrease in the passband.

A method for manufacturing a filter according to a second example aspect includes forming an initial stage coupling part and an interstage coupling part on a dielectric substrate, in which the initial stage coupling part is formed so that a reflection delay is decreased in accordance with an increase in a passband due to a manufacturing error of the substrate or the interstage coupling part, or so that the reflection delay is increased in accordance with a decrease in the passband.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

First Example Embodiment

Figure 1:
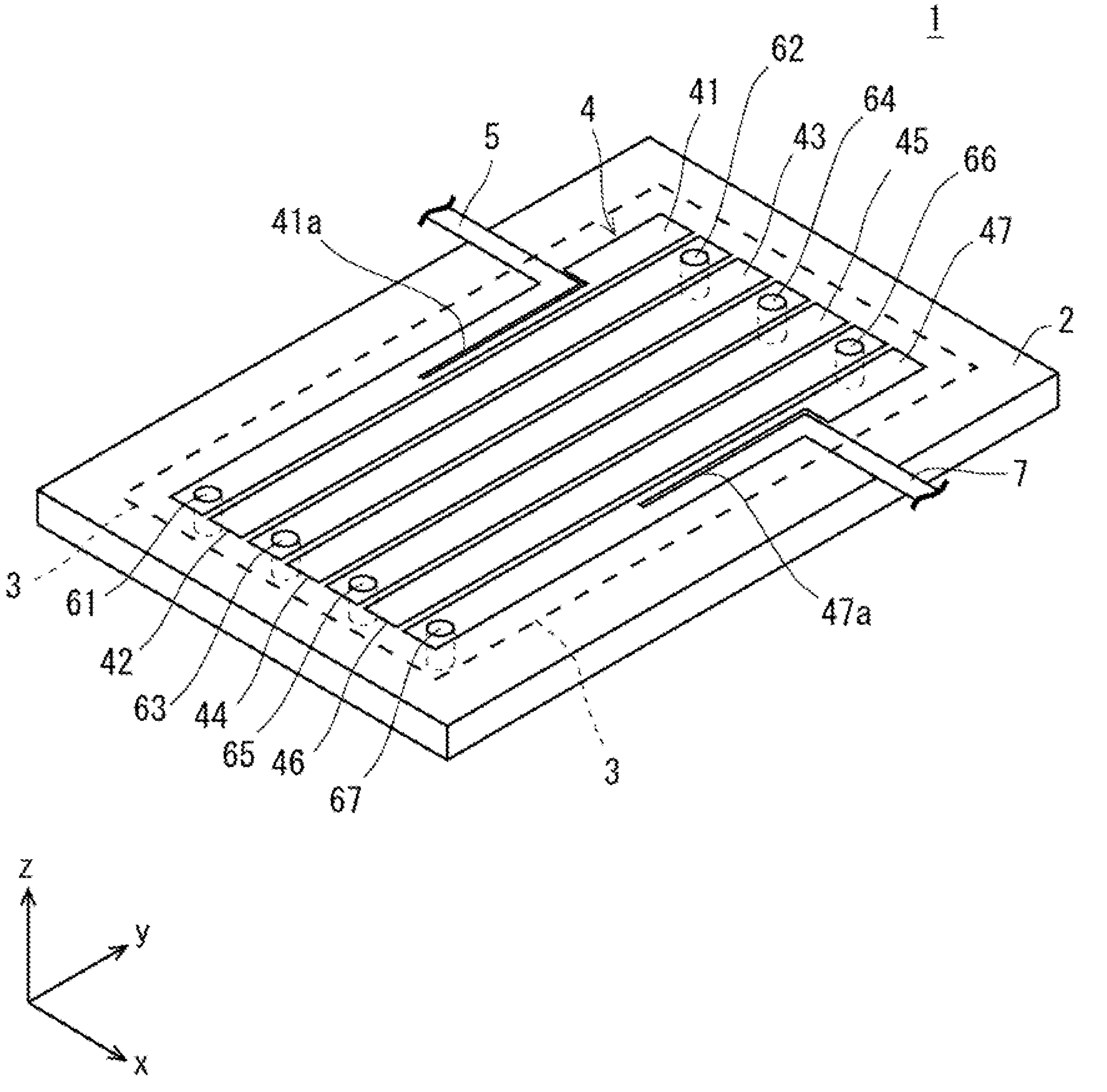
FIG. 1 is a perspective view schematically showing a filter according to a first example embodiment.
Figure 2:
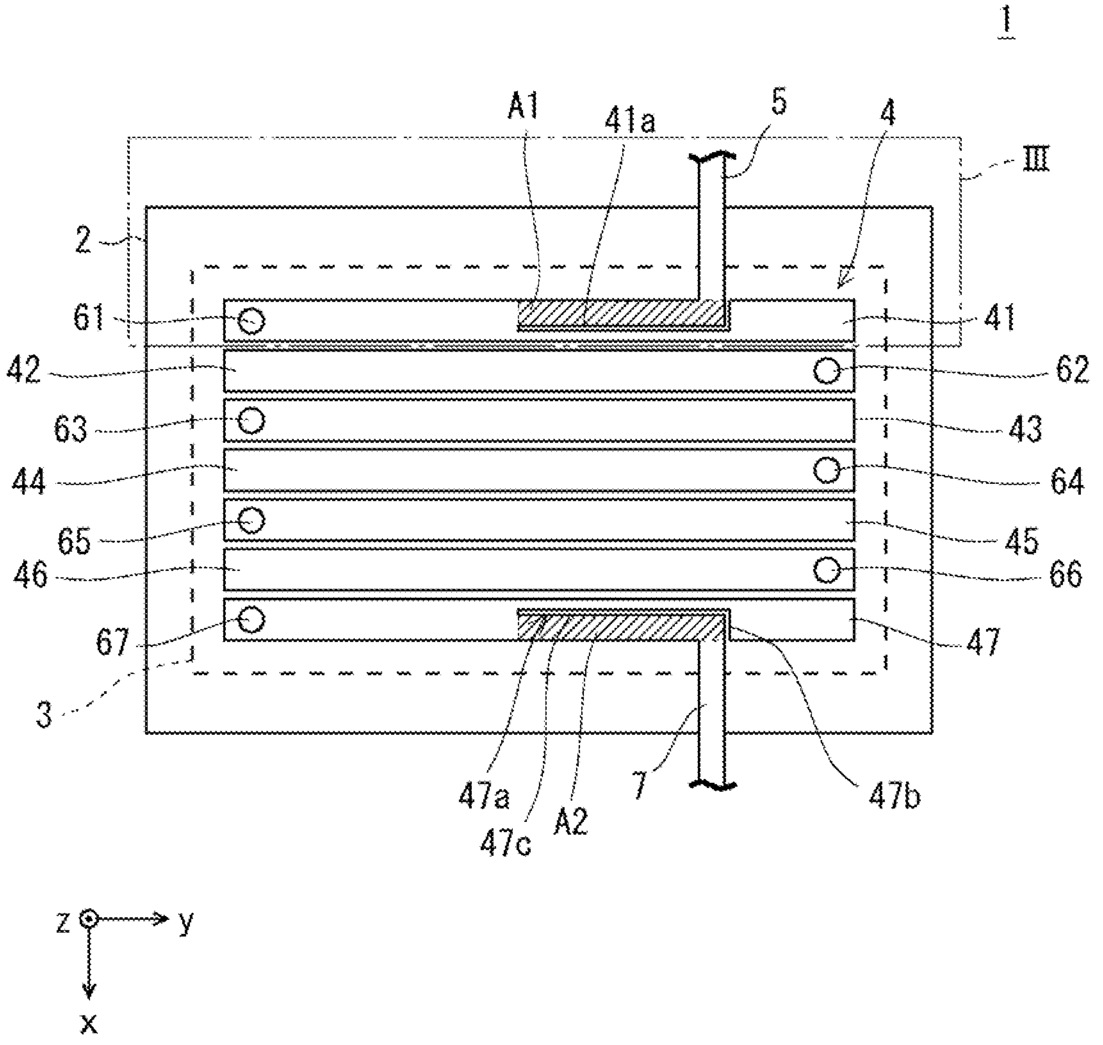
FIG. 2 is a diagram showing the filter according to the first example embodiment as viewed from the Z-axis positive side.
Figure 3:
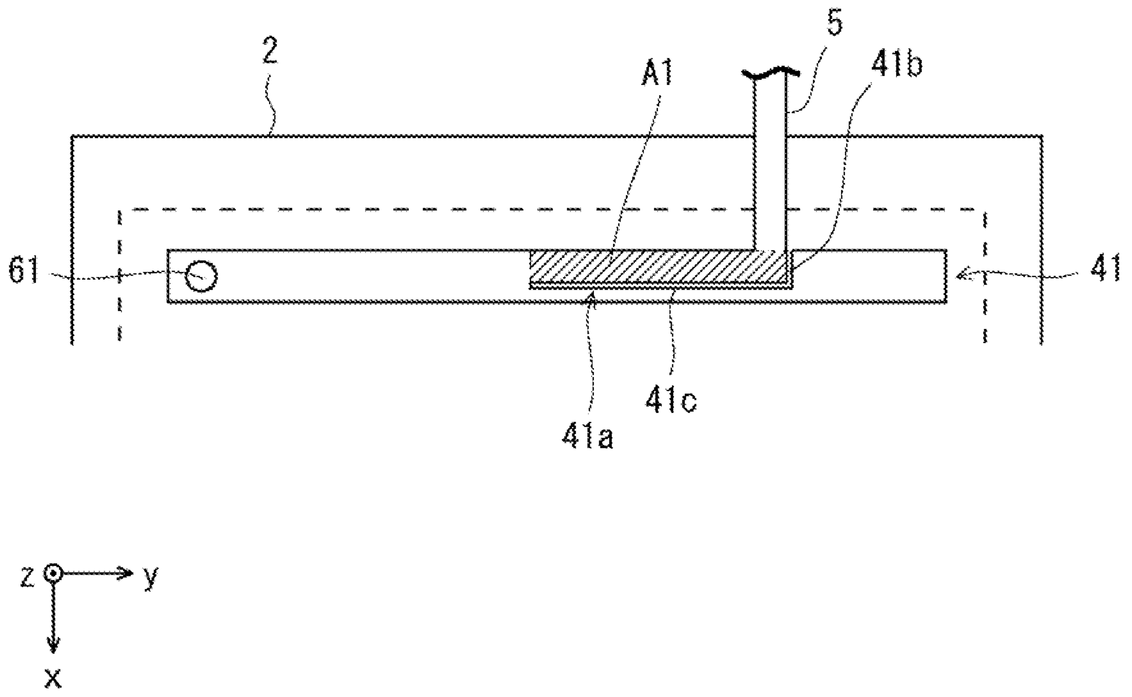
FIG. 3 is an enlarged diagram of a part III of FIG. 2.

Example embodiments of the present disclosure will be described hereinafter with reference to the drawings. Note that, in the following description, three-dimensional (XYZ) coordinate systems are used for the clarification of the description. FIG. 1 is a perspective view schematically showing a filter according to this example embodiment. FIG. 2 is a diagram showing the filter according to this example embodiment as viewed from the Z-axis positive side. FIG. 3 is an enlarged diagram of a part III of FIG. 2.

A filter 1 according to this example embodiment is configured as an interdigital seven-stage bandpass filter having a single-end short circuit. As shown in FIG. 1, the filter 1 includes a substrate 2, a ground conductor 3, and a resonator 4. The substrate 2 has a dielectric property, and has, for example, a substantially rectangular shape when viewed from the Z-axis direction. The ground conductor 3 is formed on a surface of the substrate 2 on the Z-axis negative side.

The resonator 4 is formed on a surface of the substrate 2 on the Z-axis positive side, and is a pattern of a conductor designed so as to have a distributed constant in which a Chebyshev distribution is obtained. For example, as shown in FIG. 2, the resonator 4 includes a first stage resonant conductor 41, a second stage resonant conductor 42, a third stage resonant conductor 43, a fourth stage resonant conductor 44, a fifth stage resonant conductor 45, a sixth stage resonant conductor 46, and a seventh stage resonant conductor 47.

The first stage resonant conductor 41 has, for example, a substantially rectangular shape of which the long side is extended in the Y-axis direction, and the length of the first stage resonant conductor 41 in the Y-axis direction is substantially λ/4 of the center frequency of a passband. An end part of the first stage resonant conductor 41 on the Y-axis negative side is electrically connected to the ground conductor 3 via a via electrode 61. Further, the first stage resonant conductor 41 is electrically connected to an external circuit via a first connection conductor 5. Note that λ is a wavelength corresponding to the center frequency of the passband.

As shown in FIGS. 2 and 3, a slit part 41*a* is formed in the first stage resonant conductor 41. The slit part 41*a* has, for example, an L-shape when viewed from the Z-axis direction, and includes a first part 41*b* extending in the X-axis direction and a second part 41*c* extending in the Y-axis direction.

An end part of the first part 41*b* on the X-axis negative side comes into contact with an end part of a connection part between the first stage resonant conductor 41 and the first connection conductor 5 on the Y-axis positive side. Further, an end part of the first part 41*b* on the X-axis positive side comes into contact with substantially the center of the first stage resonant conductor 41 in the X-axis direction.

An end part of the second part 41*c* on the Y-axis positive side is continuously formed with the end part of the first part 41*b* on the X-axis positive side. Further, the second part 41*c* is extended in the Y-axis negative side direction from the end part of the first part 41*b* on the X-axis positive side.

By the above configuration, an area A1 of the first stage resonant conductor 41 on the X-axis negative side with respect to the second part 41*c* of the slit part 41*a* functions as one of an input side and an output side of an input/output conductor, and the second part 41*c* of the slit part 41*a* forms an initial stage coupling part.

Note that a width dimension of the slit part 41*a*, the length of the same in the Y-axis direction, and the like can be set based on the above-described distributed constant. In FIGS. 2 and 3, the area A1 is shown by hatching.

The second stage resonant conductor 42 has, for example, a substantially rectangular shape of which the long side is extended in the Y-axis direction, and the length of the second stage resonant conductor 42 in the Y-axis direction is substantially λ/4 of the center frequency of the passband. An end part of the second stage resonant conductor 42 on the Y-axis positive side is electrically connected to the ground conductor 3 via a via electrode 62.

The second stage resonant conductor 42 is disposed on the X-axis positive side with respect to the first stage resonant conductor 41 so that they are spaced apart from each other, and as seen when the filter 1 is viewed from the X-axis direction, a substantially entire area of the side of the second stage resonant conductor 42 on the X-axis negative side overlaps the side of the first stage resonant conductor 41 on the X-axis positive side. Therefore, a gap between the first stage resonant conductor 41 and the second stage resonant conductor 42 forms an interstage coupling part.

The third stage resonant conductor 43 has, for example, a substantially rectangular shape of which the long side is extended in the Y-axis direction, and the length of the third stage resonant conductor 43 in the Y-axis direction is substantially λ/4 of the center frequency of the passband. An end part of the third stage resonant conductor 43 on the Y-axis negative side is electrically connected to the ground conductor 3 via a via electrode 63.

The third stage resonant conductor 43 is disposed at the X-axis positive side with respect to the second stage resonant conductor 42 so that they are spaced apart from each other, and as seen when the filter 1 is viewed from the X-axis direction, a substantially entire area of the side of the third stage resonant conductor 43 on the X-axis negative side overlaps the side of the second stage resonant conductor 42 on the X-axis positive side. Therefore, a gap between the second stage resonant conductor 42 and the third stage resonant conductor 43 forms an interstage coupling part.

The fourth stage resonant conductor 44 has, for example, a substantially rectangular shape of which the long side is extended in the Y-axis direction, and the length of the fourth stage resonant conductor 44 in the Y-axis direction is substantially λ/4 of the center frequency of the passband. An end part of the fourth stage resonant conductor 44 on the Y-axis positive side is electrically connected to the ground conductor 3 via a via electrode 64.

The fourth stage resonant conductor 44 is disposed at the X-axis positive side with respect to the third stage resonant conductor 43 so that they are spaced apart from each other, and as seen when the filter 1 is viewed from the X-axis direction, a substantially entire area of the side of the fourth stage resonant conductor 44 on the X-axis negative side overlaps the side of the third stage resonant conductor 43 on the X-axis positive side. Therefore, a gap between the third stage resonant conductor 43 and the fourth stage resonant conductor 44 forms an interstage coupling part.

The fifth stage resonant conductor 45 has, for example, a substantially rectangular shape of which the long side is extended in the Y-axis direction, and the length of the fifth stage resonant conductor 45 in the Y-axis direction is substantially λ/4 of the center frequency of the passband. An end part of the fifth stage resonant conductor 45 on the Y-axis negative side is electrically connected to the ground conductor 3 via a via electrode 65.

The fifth stage resonant conductor 45 is disposed at the X-axis positive side with respect to the fourth stage resonant conductor 44 so that they are spaced apart from each other, and as seen when the filter 1 is viewed from the X-axis direction, a substantially entire area of the side of the fifth stage resonant conductor 45 on the X-axis negative side overlaps the side of the fourth stage resonant conductor 44 on the X-axis positive side. Therefore, a gap between the fourth stage resonant conductor 44 and the fifth stage resonant conductor 45 forms an interstage coupling part.

The sixth stage resonant conductor 46 has, for example, a substantially rectangular shape of which the long side is extended in the Y-axis direction, and the length of the sixth stage resonant conductor 46 in the Y-axis direction is substantially λ/4 of the center frequency of the passband. An end part of the sixth stage resonant conductor 46 on the Y-axis positive side is electrically connected to the ground conductor 3 via a via electrode 66.

The sixth stage resonant conductor 46 is disposed at the X-axis positive side with respect to the fifth stage resonant conductor 45 so that they are spaced apart from each other, and as seen when the filter 1 is viewed from the X-axis direction, a substantially entire area of the side of the sixth stage resonant conductor 46 on the X-axis negative side overlaps the side of the fifth stage resonant conductor 45 on the X-axis positive side. Therefore, a gap between the fifth stage resonant conductor 45 and the sixth stage resonant conductor 46 forms an interstage coupling part.

The seventh stage resonant conductor 47 has, for example, a substantially rectangular shape of which the long side is extended in the Y-axis direction, and the length of the seventh stage resonant conductor 47 in the Y-axis direction is substantially λ/4 of the center frequency of the passband. An end part of the seventh stage resonant conductor 47 on the Y-axis negative side is electrically connected to the ground conductor 3 via a via electrode 67.

The seventh stage resonant conductor 47 is disposed at the X-axis positive side with respect to the sixth stage resonant conductor 46 so that they are spaced apart from each other, and as seen when the filter 1 is viewed from the X-axis direction, a substantially entire area of the side of the seventh stage resonant conductor 47 on the X-axis negative side overlaps the side of the sixth stage resonant conductor 46 on the X-axis positive side. Therefore, a gap between the sixth stage resonant conductor 46 and the seventh stage resonant conductor 47 forms an interstage coupling part.

The seventh stage resonant conductor 47 is electrically connected to an external circuit via a second connection conductor 7. As shown in FIG. 2, a slit part 47*a* is formed in the seventh stage resonant conductor 47. The slit part 47*a* has, for example, an L-shape when viewed from the Z-axis direction, and includes a first part 47*b* extending in the X-axis direction and a second part 47*c* extending in the Y-axis direction.

An end part of the first part 47*b* on the X-axis positive side comes into contact with an end part of a connection part between the seventh stage resonant conductor 47 and the second connection conductor 7 on the Y-axis positive side. Further, an end part of the first part 47*b* on the X-axis negative side comes into contact with substantially the center of the seventh stage resonant conductor 47 in the X-axis direction.

An end part of the second part 47*c* on the Y-axis positive side is continuously formed with the end part of the first part 47*b* on the X-axis negative side. Further, the second part 47*c* is extended in the Y-axis negative side direction from the end part of the first part 47*b* on the X-axis negative side.

By the above configuration, an area A2 of the seventh stage resonant conductor 47 on the X-axis positive side with respect to the second part 47*c* of the slit part 47*a* functions as the other one of the input side and the output side of the input/output conductor, and the second part 47*c* of the slit part 47*a* forms an initial stage coupling part.

Note that, like in the case of the slit part 41*a*, a width dimension of the slit part 47*a*, the length of the same in the Y-axis direction, and the like can be set based on the above-described distributed constant. In FIG. 2, the area A2 is shown by hatching.

Incidentally, a normalized element value of a bandpass filter of the Chebyshev distribution can be obtained by using Table 1.

TABLE 1

| VALUE OF a | $g_1$ | $g_2$ | $g_3$ | $g_4$ | $g_5$ | $g_6$ | $g_7$ | $g_8$ | $g_9$ | $g_{10}$ | $g_{11}$ |
|---|---|---|---|---|---|---|---|---|---|---|---|
| 0.01 db ripple | | | | | | | | | | | |
| 1 | 0.0960 | 1.0000 | | | | | | | | | |
| 2 | 0.4488 | 0.4077 | 1.1007 | | | | | | | | |
| 3 | 0.6291 | 0.9702 | 0.6291 | 1.0000 | | | | | | | |
| 4 | 0.7128 | 1.2003 | 1.3212 | 0.6476 | 1.1007 | | | | | | |
| 5 | 0.7563 | 1.3049 | 1.5773 | 1.3049 | 0.7563 | 1.0000 | | | | | |
| 6 | 0.7813 | 1.3600 | 1.6896 | 1.5350 | 1.4970 | 0.7098 | 1.1007 | | | | |
| 7 | 0.7969 | 1.3924 | 1.7481 | 1.6331 | 1.7481 | 1.3924 | 0.7969 | 1.0000 | | | |
| 8 | 0.8072 | 1.4130 | 1.7824 | 1.6833 | 1.8529 | 1.6193 | 1.5554 | 0.7333 | 1.1007 | | |
| 9 | 0.8144 | 1.4270 | 1.8043 | 1.7125 | 1.9057 | 1.7125 | 1.8043 | 1.4270 | 0.8144 | 1.0000 | |
| 10 | 0.8196 | 1.4369 | 1.8192 | 1.7311 | 1.9362 | 1.7590 | 1.9055 | 1.6527 | 1.5817 | 0.7446 | 1.1007 |
| 0.1 db ripple | | | | | | | | | | | |
| 1 | 0.3052 | 1.0000 | | | | | | | | | |
| 2 | 0.8430 | 0.6220 | 1.3554 | | | | | | | | |
| 3 | 1.0315 | 1.1474 | 1.0315 | 1.0000 | | | | | | | |
| 4 | 1.1088 | 1.3061 | 1.7703 | 0.8180 | 1.3554 | | | | | | |
| 5 | 1.1468 | 1.3712 | 1.9750 | 1.3712 | 1.1468 | 1.0000 | | | | | |
| 6 | 1.1681 | 1.4039 | 2.0562 | 1.5170 | 1.9029 | 0.8618 | 1.3554 | | | | |
| 7 | 1.1811 | 1.4228 | 2.0966 | 1.5733 | 2.0966 | 1.4228 | 1.1811 | 1.0000 | | | |
| 8 | 1.1897 | 1.4346 | 2.1199 | 1.6010 | 2.1699 | 1.5640 | 1.9444 | 0.8778 | 1.3554 | | |
| 9 | 1.1956 | 1.4425 | 2.1345 | 1.6167 | 2.2053 | 1.6167 | 2.1345 | 1.4425 | 1.1956 | 1.0000 | |
| 10 | 1.1999 | 1.4481 | 2.1444 | 1.6255 | 2.2253 | 1.6418 | 2.2046 | 1.5821 | 1.9628 | 0.5853 | 1.3554 |
| 0.2 db ripple | | | | | | | | | | | |
| 1 | 0.4342 | 1.0000 | | | | | | | | | |
| 2 | 1.0378 | 0.6745 | 1.5386 | | | | | | | | |
| 3 | 1.2275 | 1.1525 | 1.2275 | 1.0000 | | | | | | | |

TABLE 1-continued

| VALUE OF a | $g_1$ | $g_2$ | $g_3$ | $g_4$ | $g_5$ | $g_6$ | $g_7$ | $g_8$ | $g_9$ | $g_{10}$ | $g_{11}$ |
|---|---|---|---|---|---|---|---|---|---|---|---|
| 4 | 1.3028 | 1.2844 | 1.9761 | 0.8468 | 1.5386 | | | | | | |
| 5 | 1.3394 | 1.3370 | 2.1660 | 1.3370 | 1.3394 | 1.0000 | | | | | |
| 6 | 1.3598 | 1.3632 | 2.2394 | 1.4555 | 2.0974 | 0.8838 | 1.5386 | | | | |
| 7 | 1.3722 | 1.3781 | 2.2756 | 1.5001 | 2.2756 | 1.3781 | 1.3722 | 1.0000 | | | |
| 8 | 1.3804 | 1.3875 | 2.2963 | 1.5217 | 2.3413 | 1.4925 | 2.1349 | 0.8972 | 1.5386 | | |
| 9 | 1.3860 | 1.3938 | 2.3093 | 1.5340 | 2.3728 | 1.5340 | 2.3093 | 1.3938 | 1.3860 | 1.0000 | |
| 10 | 1.3901 | 1.3983 | 2.3101 | 1.5417 | 2.3904 | 1.5536 | 2.3720 | 1.5066 | 2.1514 | 0.9034 | 1.5386 |
| | | | | | 0.5 db ripple | | | | | | |
| 1 | 0.6986 | 1.0000 | | | | | | | | | |
| 2 | 1.4029 | 0.7071 | 1.9841 | | | | | | | | |
| 3 | 1.5963 | 1.0967 | 1.5963 | 1.0000 | | | | | | | |
| 4 | 1.6703 | 1.1926 | 2.3661 | 0.8419 | 1.9841 | | | | | | |
| 5 | 1.7058 | 1.2296 | 2.5408 | 1.2296 | 1.7058 | 1.0000 | | | | | |
| 6 | 1.7254 | 1.2479 | 2.6064 | 1.3137 | 2.4758 | 0.8696 | 1.9841 | | | | |
| 7 | 1.7372 | 1.2583 | 2.6381 | 1.3444 | 2.6381 | 1.2583 | 1.7372 | 1.0000 | | | |
| 8 | 1.7451 | 1.2647 | 2.6564 | 1.3590 | 2.6964 | 1.3389 | 2.5093 | 0.8796 | 1.9841 | | |
| 9 | 1.7504 | 1.2690 | 2.6678 | 1.3673 | 2.7239 | 1.3673 | 2.6678 | 1.2690 | 1.7504 | 1.0000 | |
| 10 | 1.7543 | 1.2721 | 2.6754 | 1.3725 | 2.7392 | 1.3806 | 2.7231 | 1.3485 | 2.5239 | 0.8842 | 1.9841 |

where g is the normalized element value and n is the number of stages from the input side of the resonant conductor. For example, regarding g1, g1=0.8072 holds when n=8 and ripple=0.01 dB.

Further, a coupling coefficient of the initial stage coupling part corresponds to an external Q value. The external Q value is, for example, a value indicating a matching point between the first stage resonant conductor 41 or the seventh stage resonant conductor 47 and the external circuit, and can be derived based on the following <Expression 1> by using the normalized element value.

$$Q_{ext} = \frac{g_0 \cdot g_1 \cdot \omega_l'}{\omega} \quad \text{[Expression 1]}$$

where $Q_{ext}$ is the external Q value of the initial stage coupling part. Further, $g_0$, which is an input/output impedance when it is assumed that the normalized low-pass prototype filter is used, is 1Ω. Further, $\omega_1'$, which is an angular frequency of an edge of the passband, is 1. Further, ψ, which is an angular frequency, can be determined by $\omega_{rip}$ (a ripple bandwidth)/$f_0$ (the center frequency of the passband).

Further, the external Q value satisfies the relation between it and a reflection delay expressed by the following <Expression 2>.

$$Q_{ext} = \frac{2\pi f_p(\tau_p - \tau_\infty)}{4} \quad \text{[Expression 2]}$$

Here, the reflection delay is a delay amount of a reflection signal with regard to a signal incident to the resonator. Note that $\tau_p$ is the reflection delay of the initial stage coupling part. Further, $f_p$ is a resonant frequency. In this case, $\tau_\infty=0$ may hold.

Generally, the first to the seventh resonant conductors 41 to 47 are formed by etching or the like. In such a case, for example, since the respective degrees of the melting of copper foil become corresponding manufacturing variations of the first to the seventh resonant conductors 41 to 47 as they are, a manufacturing error appears almost uniformly in the width dimension (i.e., the width dimension of the gap between adjacent resonant conductors) of each interstage coupling part.

At this time, when the interstage couplings change almost uniformly, they do not significantly deviate from the Chebyshev distribution, and therefore the changes appear as changes in the passband of the filter. For example, when the width dimension of the interstage coupling part is increased, the passband of the filter is reduced, and accordingly it is necessary to increase the value of the reflection delay of the initial stage coupling part. On the other hand, when the width dimension of the interstage coupling part is reduced, the passband of the filter is increased, and accordingly it is necessary to reduce the value of the reflection delay of the initial stage coupling part.

Meanwhile, when a substrate is formed, the thickness of the substrate is changed due to a manufacturing error. At this time, when the thickness of the substrate is increased, the passband of the filter is increased, and accordingly it is necessary to reduce the value of the reflection delay of the initial stage coupling part. On the other hand, when the thickness of the substrate is reduced, the passband of the filter is reduced, and accordingly it is necessary to increase the value of the reflection delay of the initial stage coupling part.

As described above, in this example embodiment, the slit parts 41*a* and 47*a* are formed in the first resonant conductor 41 and the seventh resonant conductor 47, respectively. Therefore, like in the case in which the gaps between the respective resonant conductors are increased by etching or the like, the width dimensions of the slit parts 41*a* and 47*a* are increased, and the external Q value is increased accordingly. On the other hand, like in the case in which the gaps between the respective resonant conductors are reduced, the width dimensions of the slit parts 41*a* and 47*a* are reduced, and the external Q value is reduced accordingly.

Figure 4:
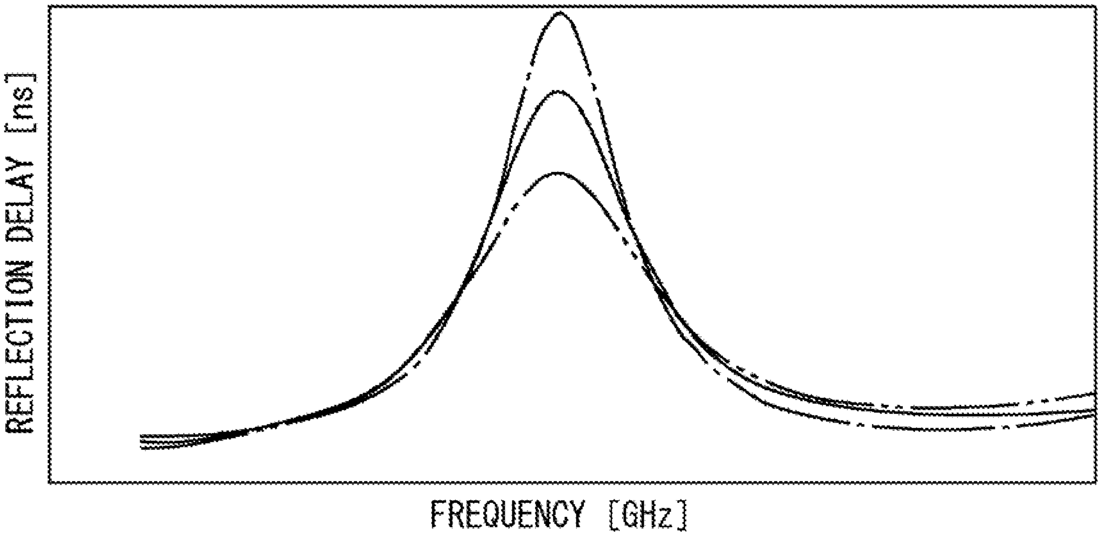
FIG. 4 is a diagram showing respective characteristics of an initial stage coupling part of the filter according to the first example embodiment obtained when width dimensions of a slit part are different.
Figure 5:
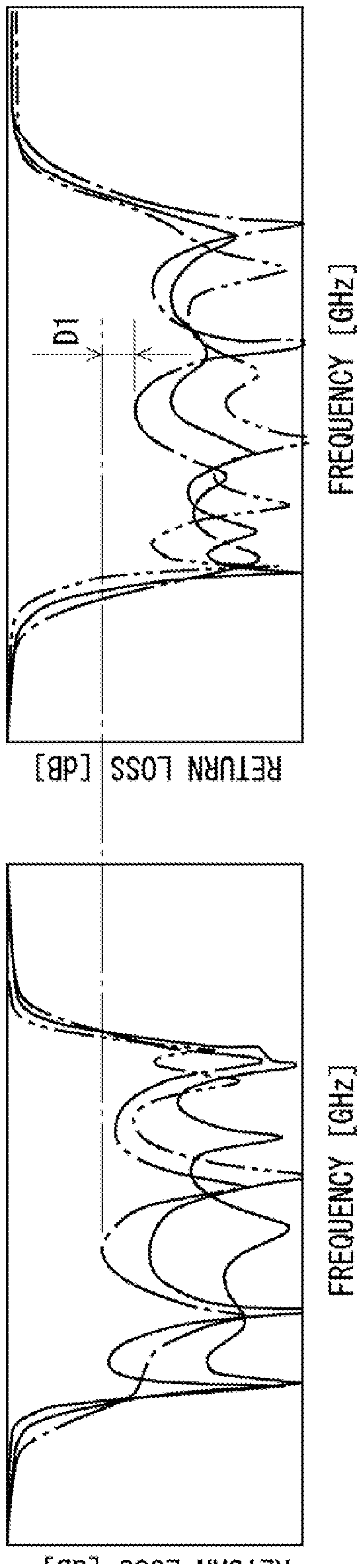
FIG. 5 is a diagram for comparing respective return loss characteristics of the filter according to the first example embodiment obtained when gaps between resonant conductors are different with respective return loss characteristics of a filter having no slit parts formed therein obtained when the gaps between the resonant conductors are different.

FIG. 4 is a diagram showing respective characteristics of the initial stage coupling part of the filter according to this example embodiment obtained when the width dimensions of the slit part are different. FIG. 5 is a diagram for comparing respective return loss characteristics of the filter according to this example embodiment obtained when the gaps between the resonant conductors are different with respective return loss characteristics of a filter having no slit parts formed therein obtained when the gaps between the resonant conductors are different. In FIG. 5, the return loss characteristics of the filter according to this example embodiment are shown on the right side thereof, and the return loss characteristics of the filter having no slit parts formed therein are shown on the left side thereof.

In FIG. 4, the horizontal axis indicates the frequency, and the vertical axis indicates the reflection delay. Further, in FIG. 5, the horizontal axis indicates the frequency, and the vertical axis indicates the return loss. Further, in FIGS. 4 and 5, a solid line indicates the characteristic of the initial stage coupling part of which the width dimension of the slit part is a reference dimension, an alternate long and short dash line indicates the characteristic of the initial stage coupling part of which the width dimension of the slit part is +40 μm with respect to the reference dimension, and an alternate long and two short dashes line indicates the characteristic of the initial stage coupling part of which the width dimension of the slit part is −40 μm with respect to the reference dimension.

As shown in FIG. 4, the filter 1 according to this example embodiment can change the reflection delay of the initial stage coupling part in a direction in which the reflection delay of the initial stage coupling part is increased or in a direction in which it is decreased determined by a manufacturing error due to etching. Therefore, as shown in FIG. 5, the filter 1 according to this example embodiment has decreased the deterioration of the return loss more than it is decreased by the filter having no slit parts 41*a* and 47*a* formed therein. Note that D1 shown in FIG. 5 is an example of the deterioration of the return loss that has been decreased.

Meanwhile, when the thickness of the substrate 2 is increased due to a manufacturing error of the substrate 2, the characteristic impedances of the first resonant conductor 41 and the seventh resonant conductor 47 are changed due to the slit parts 41*a* and 47*a* that are respectively formed in the first resonant conductor 41 and the seventh resonant conductor 47, and the external Q value is reduced. On the other hand, when the thickness of the substrate 2 is reduced, the characteristic impedances of the first resonant conductor 41 and the seventh resonant conductor 47 are changed, and the external Q value is increased.

Figure 6:
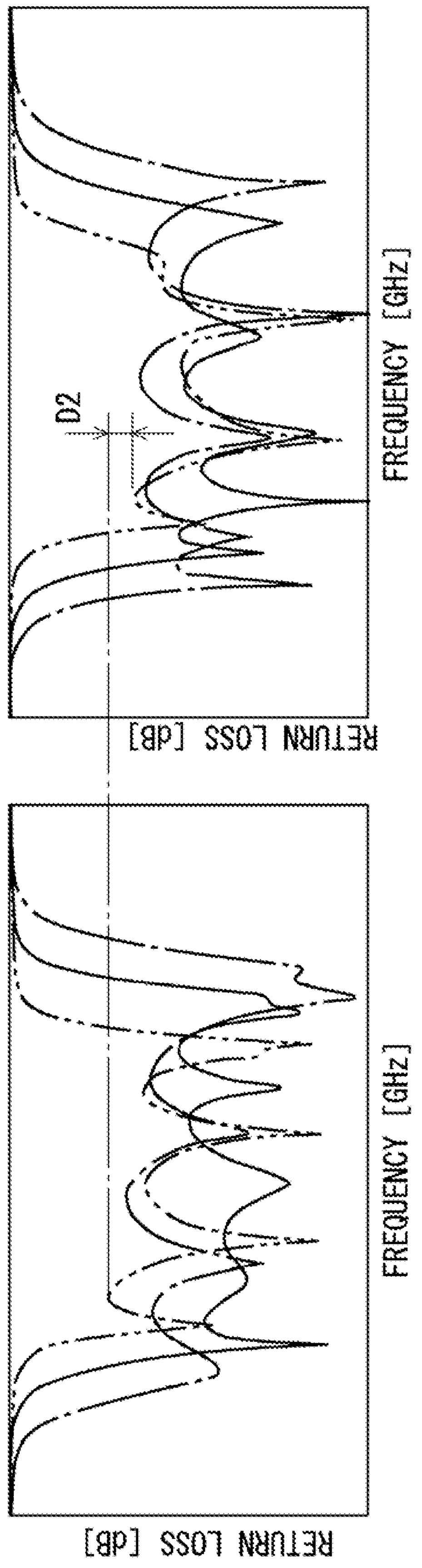
FIG. 6 is a diagram for comparing respective return loss characteristics of the filter according to the first example embodiment obtained when thicknesses of a substrate are different with respective return loss characteristics of the filter having no slit parts formed therein obtained when the thicknesses of the substrate are different.

FIG. 6 is a diagram for comparing respective return loss characteristics of the filter according to this example embodiment obtained when the thicknesses of the substrate are different with respective return loss characteristics of the filter having no slit parts formed therein obtained when the thicknesses of the substrate are different. In FIG. 6, the return loss characteristics of the filter according to this example embodiment is shown on the right side thereof, and the return loss characteristics of the filter having no slit parts formed therein is shown on the left side thereof.

Note that, in FIG. 6, the horizontal axis indicates the frequency, and the vertical axis indicates the return loss. Further, in FIG. 6, a solid line indicates the characteristic of the initial stage coupling part when the thickness of the substrate is a reference thickness, an alternate long and short dash line indicates the characteristic of the initial stage coupling part when the thickness of the substrate is +20% of the reference thickness, and an alternate long and two short dashes line indicates the characteristic of the initial stage coupling part when the thickness of the substrate is −20% of the reference thickness.

As shown in FIG. 6, the filter 1 according to this example embodiment can change the reflection delay of the initial stage coupling part in a direction in which the reflection delay of the initial stage coupling part is increased or in a direction in which it is decreased determined by a manufacturing error of the substrate. Therefore, the filter 1 according to this example embodiment has decreased the deterioration of the return loss more than it is decreased by the filter having no slit parts 41*a* and 47*a* formed therein. Note that D2 shown in FIG. 6 is an example of the deterioration of the return loss that has been decreased.

As described above, the filter 1 according to this example embodiment can make the reflection delay of the initial stage coupling part correspond to a change in the passband due to a manufacturing error of the substrate 2 or the like. That is, the initial stage coupling part is formed so that the reflection delay is decreased in accordance with an increase in the passband due to a manufacturing error of the substrate 2 or the interstage coupling part, or so that the reflection delay is increased in accordance with a decrease in the passband.

Specifically, the initial stage coupling part is formed, based on a manufacturing error of the substrate 2 or the interstage coupling part, so that when the passband is increased as compared with a passband obtained when there is no manufacturing error, the reflection delay is decreased as compared with a reflection delay obtained when there is no manufacturing error, or so that when the passband is decreased as compared with a passband obtained when there is no manufacturing error, the reflection delay is increased as compared with a reflection delay obtained when there is no manufacturing error. Therefore, the filter 1 according to this example embodiment can decrease the deterioration of the return loss.

Second Example Embodiment

Figure 7:
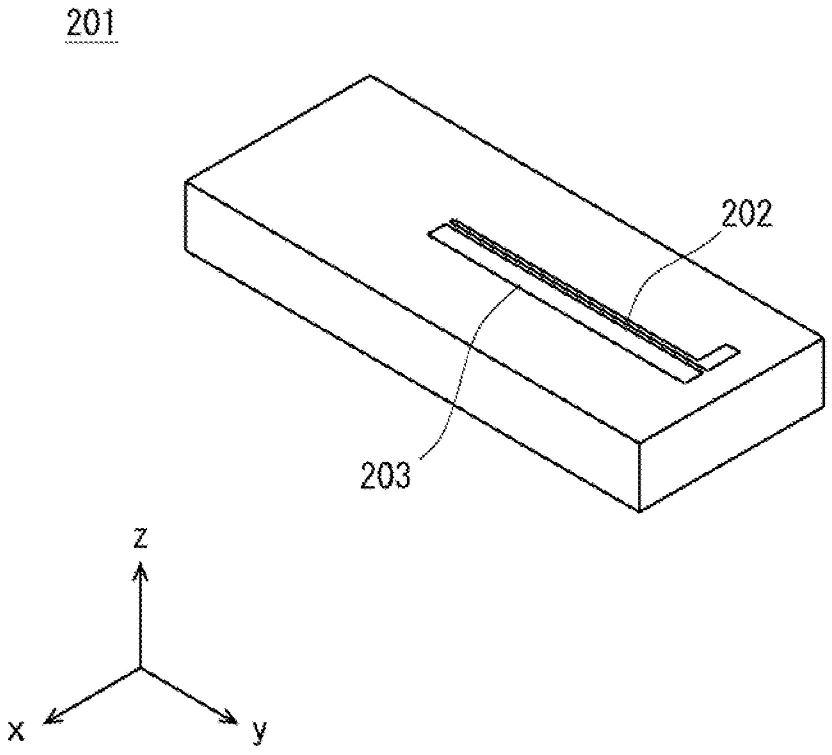
FIG. 7 is a perspective view showing an extracted initial stage coupling part of a filter according to a second example embodiment.
Figure 8:
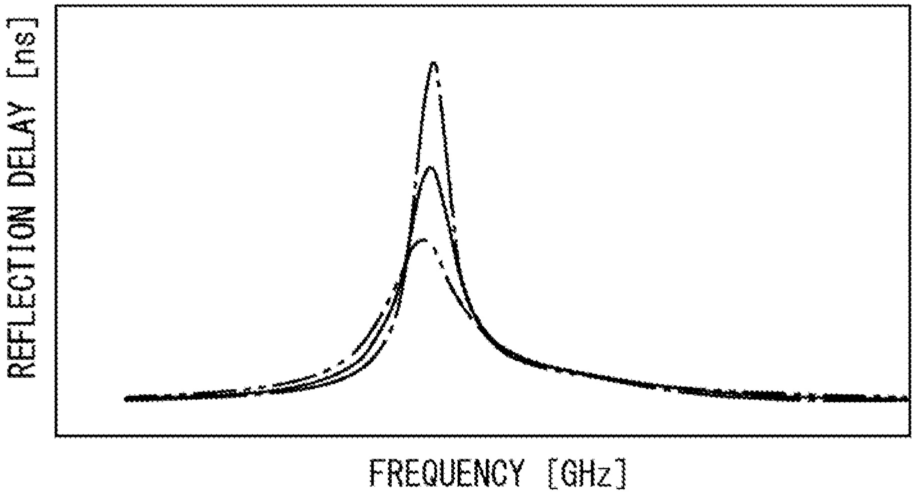
FIG. 8 is a diagram showing respective characteristics of the initial stage coupling part of the filter according to the second example embodiment obtained when width dimensions of a slit part are different.

FIG. 7 is a perspective view showing an extracted initial stage coupling part of a filter according to this example embodiment. FIG. 8 is a diagram showing respective characteristics of an initial stage coupling part of the filter according to this example embodiment obtained when width dimensions of a slit part are different. Note that FIG. 7 is simplified by omitting some of resonant conductors forming a resonator formed on the surface of the substrate 2 on the Z-axis positive side, a ground conductor and via electrodes formed on the surface of the substrate 2 on the Z-axis negative side, and the like.

In FIG. 8, the horizontal axis indicates the frequency, and the vertical axis indicates the reflection delay. Further, in FIG. 8, a solid line indicates the characteristic of the initial stage coupling part of which the width dimension of the slit part is a reference dimension, an alternate long and short dash line indicates the characteristic of the initial stage coupling part of which the width dimension of the slit part is +40 μm with respect to the reference dimension, and an alternate long and two short dashes line indicates the characteristic of the initial stage coupling part of which the width dimension of the slit part is −40 μm with respect to the reference dimension.

The initial stage coupling part of the filter 1 according to the first example embodiment is formed by the slit part 41*a* of the first stage resonant conductor 41 and the slit part 47*a* of the seventh stage resonant conductor 47. However, like in the case of a filter 201 shown in FIG. 7, an input/output conductor 202 and a resonant conductor 203 forming the initial stage coupling part may be individually formed.

As shown in FIG. 8, the filter 201 having the above configuration, like the filter 1 according to the first example embodiment, can make the reflection delay of the initial stage coupling part correspond to a change in the passband due to a manufacturing error of the substrate 2 or the like.

Therefore, the filter 201 according to this example embodiment can decrease the deterioration of the return loss.

Third Example Embodiment

Figure 9:
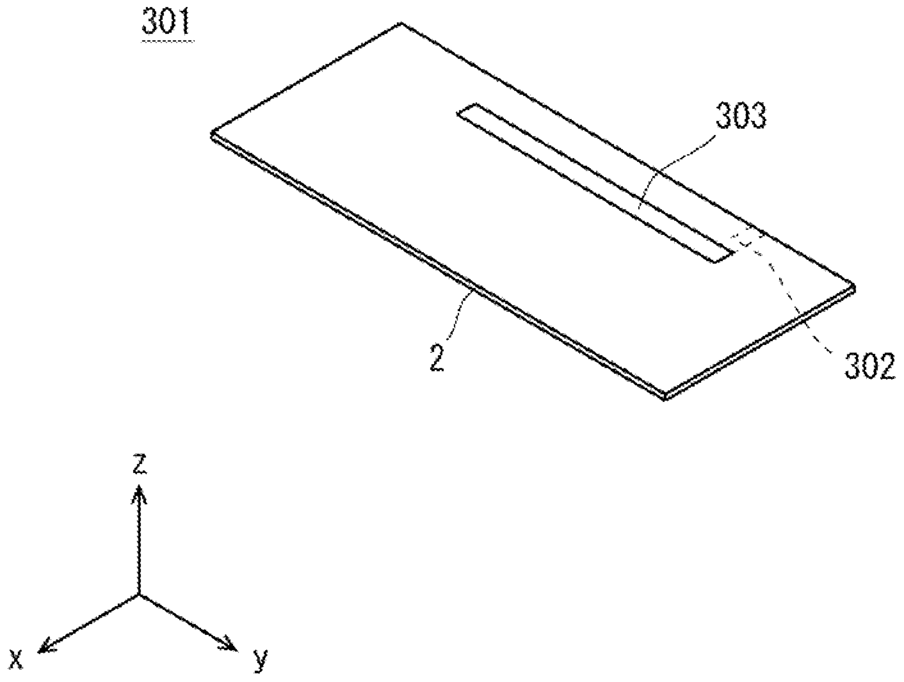
FIG. 9 is a perspective view showing an extracted initial stage coupling part of a filter according to a third example embodiment.
Figure 10:
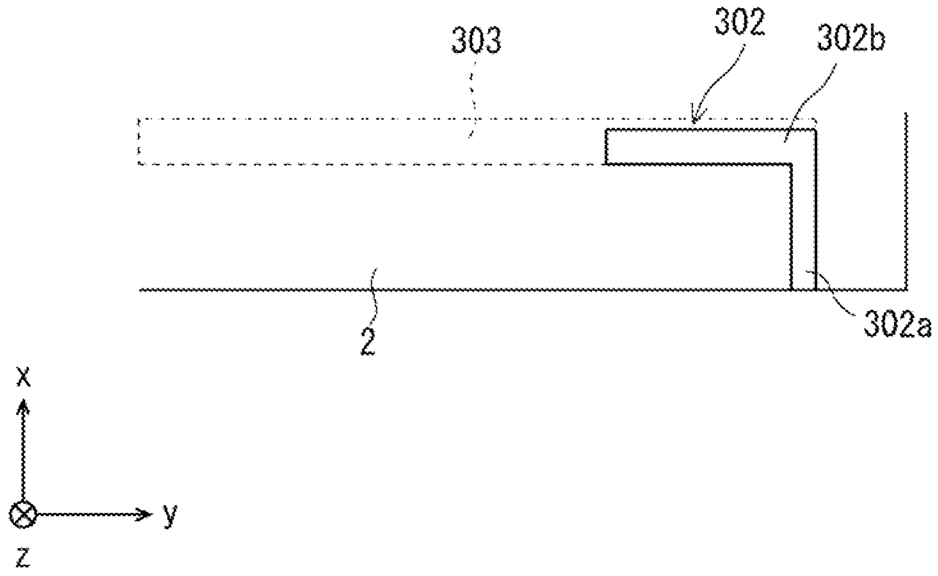
FIG. 10 is a diagram showing the initial stage coupling part of the filter according to the third example embodiment as viewed from the Z-axis negative side.
Figure 11:
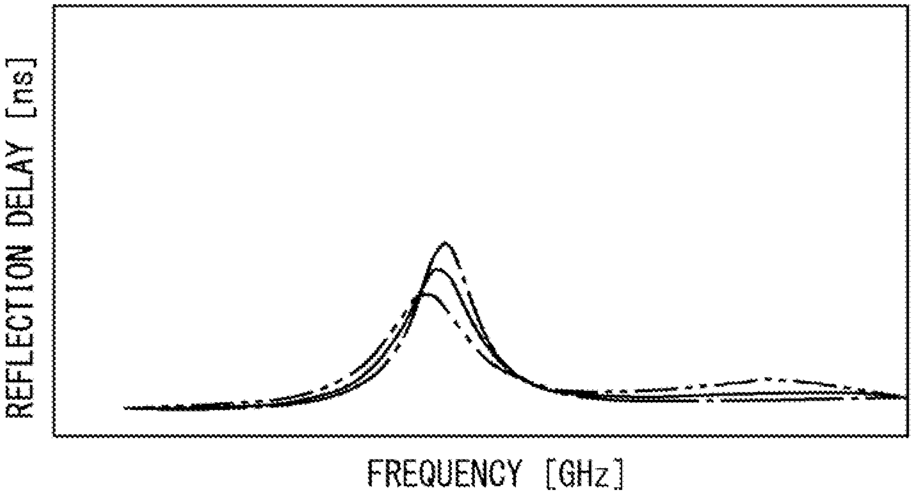
FIG. 11 is a diagram showing respective characteristics of the initial stage coupling part of the filter according to the third example embodiment obtained when the thicknesses of the substrate are different.

FIG. 9 is a perspective view showing an extracted initial stage coupling part of a filter according to this example embodiment. FIG. 10 is a diagram showing the initial stage coupling part of the filter according to this example embodiment as viewed from the Z-axis negative side. FIG. 11 is a diagram showing respective characteristics of the initial stage coupling part of the filter according to this example embodiment obtained when the thicknesses of the substrate are different. Note that each of FIGS. 9 and 10 is simplified by omitting some of resonant conductors forming a resonator formed on the surface of the substrate 2 on the Z-axis positive side, a ground conductor and via electrodes formed on the surface of the substrate 2 on the Z-axis negative side, and the like.

In FIG. 11, the horizontal axis indicates the frequency, and the vertical axis indicates the reflection delay. Further, in FIG. 11, a solid line indicates the characteristic of the initial stage coupling part when the thickness of the substrate is a reference thickness, an alternate long and short dash line indicates the characteristic of the initial stage coupling part when the thickness of the substrate is +20% of the reference thickness, and an alternate long and two short dashes line indicates the characteristic of the initial stage coupling part when the thickness of the substrate is −20% of the reference thickness.

While the initial stage coupling part of the filter 1 according to the first embodiment is formed by the slit part 41*a* of the first stage resonant conductor 41 and the slit part 47*a* of the seventh stage resonant conductor 47, a filter 301 according to this example embodiment forms the initial stage coupling part by utilizing the thickness of the substrate 2.

Since the initial stage coupling part on the input side and the initial stage coupling part on the output side are formed so as to be line symmetrical with the Y-axis as the axis of symmetry, one of the configuration of the initial stage coupling part on the input side and the configuration of the initial stage coupling part on the output side will be described in the following description as a representative example.

As shown in FIGS. 9 and 10, an input/output conductor 302 is formed on a surface of the substrate 2 on the Z-axis negative side. As shown in FIG. 10, for example, the input/output conductor 302 has a substantially L-shape when viewed from the Z-axis direction, and includes a first part 302*a* and a second part 302*b*.

The first part 302*a* is extended in the X-axis direction, and an end part of the first part 302*a* on the X-axis negative side is electrically connected to an external circuit. The second part 302*b* is extended in the Y-axis direction, and an end part of the second part 302*b* on the Y-axis positive side comes into contact with an end part of the first part 302*a* on the X-axis positive side. That is, the second part 302*b* is extended in the Y-axis negative side direction from the end part of the first part 302*a* on the X-axis positive side.

As shown in FIGS. 9 and 10, a first stage resonant conductor 303 is formed on the surface of the substrate 2 on the Z-axis positive side, and is electrically connected to a ground conductor. The first stage resonant conductor 303 has a substantially rectangular shape of which the long side is extended in the Y-axis direction, and is opposed to the second part 302*b* of the input/output conductor 302 in the Z-axis direction. Thus, the initial stage coupling part is formed between the second part 302*b* of the input/output conductor 302 and the first stage resonant conductor 303.

In the filter 301 having the above configuration, when the thickness of the substrate 2 is increased due to a manufacturing error of the substrate 2, the passband of the filter 301 is reduced and the coupling force of the initial stage coupling part is reduced. Accordingly, the reflection delay is increased as shown in FIG. 11. On the other hand, when the thickness of the substrate 2 is reduced, the passband of the filter 301 is increased and the coupling force of the initial stage coupling part is increased. Accordingly, the reflection delay is reduced as shown in FIG. 11.

By the above, the filter 301 according to this example embodiment, like the above-described filters, can make the reflection delay of the initial stage coupling part correspond to a change in the passband due to a manufacturing error of the substrate 2. Therefore, the filter 301 according to this example embodiment, like the above-described filters, can decrease the deterioration of the return loss.

Fourth Example Embodiment

Figure 12:
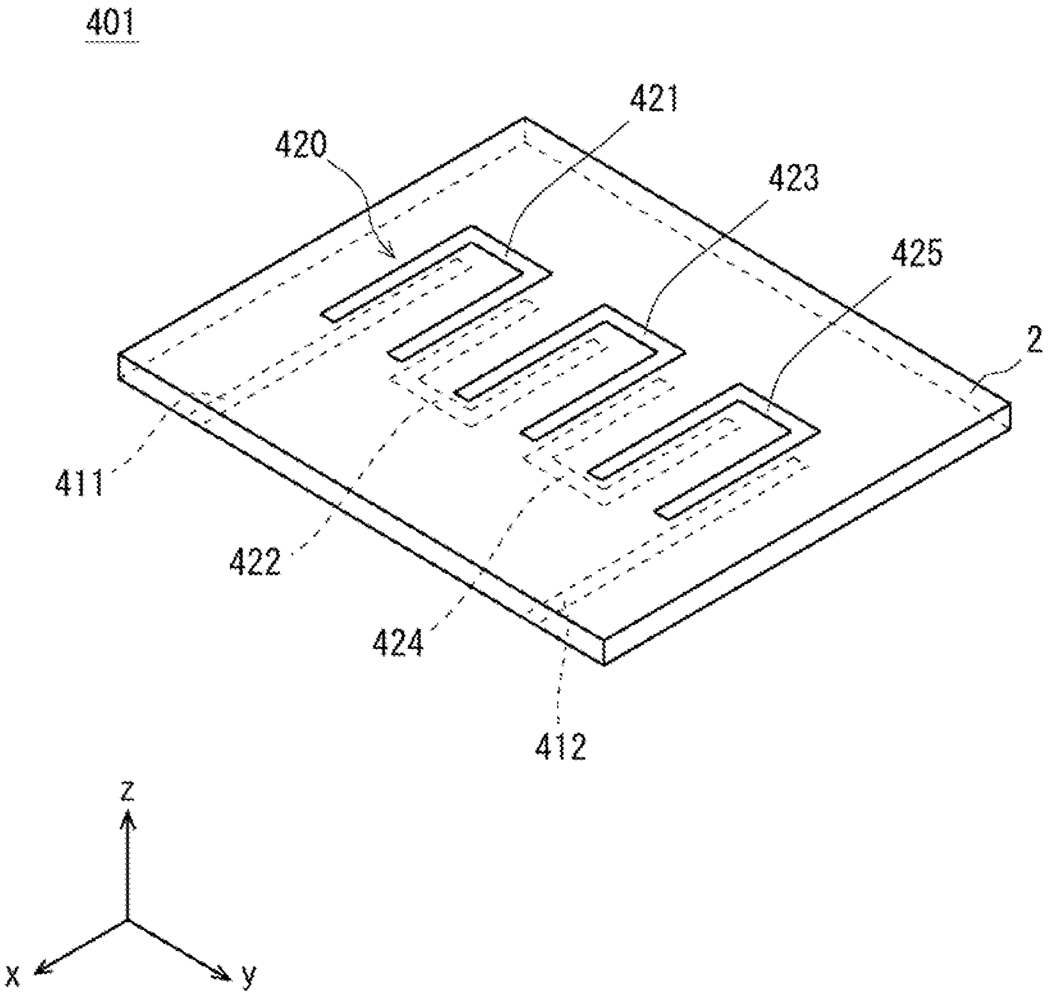
FIG. 12 is a perspective view schematically showing a filter according to a fourth example embodiment.

FIG. 12 is a perspective view schematically showing a filter according to this example embodiment. Note that FIG. 12 is simplified by omitting a ground conductor, via electrodes, and the like. As shown in FIG. 12, a filter 401 according to this example embodiment includes a first input/output conductor 411, a second input/output conductor 412, and a resonator 420.

The first input/output conductor 411 has a substantially rectangular shape of which the long side is extended in the X-axis direction, and is formed on the surface of the substrate 2 on the Z-axis negative side. The second input/output conductor 412 has a substantially rectangular shape of which the long side is extended in the X-axis direction, and is formed on the surface of the substrate 2 on the Z-axis negative side. The first input/output conductor 411 and the second input/output conductor 412 are disposed in the Y-axis direction so that they are spaced apart from each other.

The resonator 420 includes a first resonant conductor 421, a second resonant conductor 422, a third resonant conductor 423, a fourth resonant conductor 424, and a fifth resonant conductor 425, and each of these resonant conductors is electrically connected to a ground conductor.

The first resonant conductor 421 has, for example, a substantially U-shape of which the X-axis positive side is open when viewed from the Z-axis direction, and is formed on the surface of the substrate 2 on the Z-axis positive side. A part of the first resonant conductor 421, which is disposed on the Y-axis negative side and is extended in the X-axis direction, is opposed to the first input/output conductor 411 in the Z-axis direction.

The second resonant conductor 422 has, for example, a substantially U-shape of which the X-axis negative side is open, and is formed on the surface of the substrate 2 on the Z-axis negative side. A part of the second resonant conductor 422, which is disposed on the Y-axis negative side and is extended in the X-axis direction, is opposed in the Z-axis direction to a part of the first resonant conductor 421, which is disposed on the Y-axis positive side and is extended in the X-axis direction.

The third resonant conductor 423 has, for example, a substantially U-shape of which the X-axis positive side is open when viewed from the Z-axis direction, and is formed on the surface of the substrate 2 on the Z-axis positive side. A part of the third resonant conductor 423, which is disposed on the Y-axis negative side and is extended in the X-axis direction, is opposed in the Z-axis direction to a part of the second resonant conductor 422, which is disposed on the Y-axis positive side and is extended in the X-axis direction.

The fourth resonant conductor 424 has, for example, a substantially U-shape of which the X-axis negative side is open when viewed from the Z-axis direction, and is formed on the surface of the substrate 2 on the Z-axis negative side. A part of the fourth resonant conductor 424, which is disposed on the Y-axis negative side and is extended in the X-axis direction, is opposed in the Z-axis direction to a part of the third resonant conductor 423, which is disposed on the Y-axis positive side and is extended in the X-axis direction.

The fifth resonant conductor 425 has, for example, a substantially U-shape of which the X-axis positive side is open when viewed from the Z-axis direction, and is formed on the surface of the substrate 2 on the Z-axis positive side. A part of the fifth resonant conductor 425, which is disposed on the Y-axis negative side and is extended in the X-axis direction, is opposed in the Z-axis direction to a part of the fourth resonant conductor 424, which is disposed on the Y-axis positive side and is extended in the X-axis direction. Further, a part of the fifth resonant conductor 425, which is disposed on the Y-axis positive side and is extended in the X-axis direction, is opposed to the second input/output conductor 412 in the Z-axis direction.

In the filter 401 having the above configuration, like in the filter 301 according to the third example embodiment, the thickness of the substrate 2 is increased due to a manufacturing error of the substrate 2, the passband of the filter 401 is reduced and the coupling force of the initial stage coupling part is reduced. Accordingly, the reflection delay is increased. On the other hand, when the thickness of the substrate 2 is reduced, the passband of the filter 401 is increased and the coupling force of the initial stage coupling part is increased. Accordingly, the reflection delay is reduced.

By the above, the filter 401 according to this example embodiment, like the above-described filters, can make the reflection delay of the initial stage coupling part correspond to a change in the passband due to a manufacturing error of the substrate 2. Therefore, the filter 401 according to this example embodiment, like the above-described filters, can decrease the deterioration of the return loss.

Note that the present disclosure is not limited to the above-described example embodiments and may be changed as appropriate without departing from the spirit of the present disclosure.

For example, regarding the filter according to the above-described example embodiments, although an interdigital filter having a single-end short circuit is used as an example of a planar circuit filter composed of a pattern of copper foil designed on the substrate 2 so as to have a distributed constant, the filter may be a filter other than an interdigital filter as long as it is formed by etching and configured as a distributed constant circuit. That is, the filter may be, for example, a filter of a comb line type, a parallel coupling type, a hairpin line type, or an evanescent mode type.

For example, although the Chebyshev distribution filter is given as an example of a filter used in the above example embodiments, a filter based on a Butterworth function, a Bessel function, an elliptic function, a Legendre function, or the like may instead be used.

According to the above-described example aspects, it is possible to realize a filter and a method for manufacturing the same that can make a reflection delay of an initial stage coupling part correspond to a change in a passband due to a manufacturing error of a substrate or the like.

The first to forth example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A filter comprising:

a substrate having a dielectric property;

an initial stage coupling part formed on the substrate; and an interstage coupling part formed on the substrate, wherein the initial stage coupling part is formed so that a reflection delay is decreased in accordance with an increase in a passband due to a manufacturing error of the substrate or the interstage coupling part, or so that the reflection delay is increased in accordance with a decrease in the passband, and the initial stage coupling part is a gap part formed of an input/output conductor formed on one surface of the substrate and a conductor formed on another surface of the substrate facing the one surface of the substrate so that the conductor is opposed to the input/output conductor.

2. A method for manufacturing a filter, the method comprising forming an initial stage coupling part and an interstage coupling part on a dielectric substrate, wherein the initial stage coupling part is formed so that a reflection delay is decreased in accordance with an increase in a passband due to a manufacturing error of the substrate or the interstage coupling part, or so that the reflection delay is increased in accordance with a decrease in the passband, and the initial stage coupling part is a gap part formed of an input/output conductor formed on one surface of the substrate and a conductor formed on another surface of the substrate facing the one surface of the substrate so that the conductor is opposed to the input/output conductor.

3. The method according to claim 2, wherein the initial stage coupling part and the interstage coupling part are formed on the substrate by etching.

* * * * *